(12) United States Patent　　　　(10) Patent No.:　US 12,669,188 B2
　　　Sutar et al.　　　　　　　　　　(45) Date of Patent:　　　Jun. 30, 2026

(54) HYDRAULIC VALVES

(71) Applicant: Danfoss A/S, Nordborg (DK)

(72) Inventors: Nilesh Anant Sutar, Maharashtra (IN); Shital Sunil Jain, Maharashtra (IN)

(73) Assignee: Danfoss A/S, Nordborg (DK)

( * ) Notice: Subject to any disclaimer, the term of this patent is extended or adjusted under 35 U.S.C. 154(b) by 227 days.

(21) Appl. No.: 18/577,911

(22) PCT Filed: Jul. 8, 2022

(86) PCT No.: PCT/IB2022/056354
§ 371 (c)(1),
(2) Date: Jan. 9, 2024

(87) PCT Pub. No.: WO2023/281473
PCT Pub. Date: Jan. 12, 2023

(65) Prior Publication Data
US 2024/0337323 A1　　　Oct. 10, 2024

(30) Foreign Application Priority Data
Jul. 9, 2021　　(IN) .............................. 202111030832

(51) Int. Cl.
F16K 11/22　　　(2006.01)
F16K 31/363　　(2006.01)

(52) U.S. Cl.
CPC ............ F16K 11/22 (2013.01); F16K 31/363 (2013.01)

(58) Field of Classification Search
CPC ........ F16K 11/22; F16K 11/18; F16K 11/044; F16K 11/048; F16K 11/14
See application file for complete search history.

(56) References Cited

U.S. PATENT DOCUMENTS 3,779,280 A　　12/1973　Evans et al.
3,974,861 A　*　8/1976　Goto ........................ F01N 3/227
　　　　　　　　　　　　　　　　　137/627.5

(Continued)

FOREIGN PATENT DOCUMENTS

CN　　　108869436 A　　11/2018
EP　　　1653132 A1　　5/2006

OTHER PUBLICATIONS

CN108869436A Machine Translation (Year: 2006).*

(Continued)

*Primary Examiner* — Michael R Reid
(74) *Attorney, Agent, or Firm* — Merchant & Gould P.C.

(57)　　　　　　　　ABSTRACT

A hydraulic valve includes a cage defining a first port, a second port, and a third port that is disposed between the first port and the second port along a longitudinal axis. A first biased poppet is movable along the longitudinal axis relative to the first port. A second biased poppet is movable along the longitudinal axis relative to the second port. The hydraulic valve also includes an actuator and a connecting rod. The connecting rod coupled to the actuator and both of the poppets. The actuator is configured to move the connecting rod along the longitudinal axis such that in a first position, the first poppet opens the first port so the first port is in fluid communication with the third port, and in a second position, the second poppet opens the second port so the second port is in fluid communication with the third port.

18 Claims, 10 Drawing Sheets

(56)  References Cited

U.S. PATENT DOCUMENTS

| | | | | | |
|---|---|---|---|---|---|
| 4,023,593 | A | | 5/1977 | Piccardo | |
| 4,114,645 | A | * | 9/1978 | Pauliukonis | ......... F16K 31/025 |
| | | | | | 137/596.17 |
| 5,038,827 | A | * | 8/1991 | Heffner | .................. F25B 41/22 |
| | | | | | 137/625.33 |
| 5,121,947 | A | * | 6/1992 | Lee, III | ..................... F16K 7/18 |
| | | | | | 137/625.5 |
| 9,080,688 | B2 | * | 7/2015 | Satou | .................. F16K 11/044 |

OTHER PUBLICATIONS

International Search Report and Written Opinion for PCT/IB2022/056354, mailed Oct. 21, 2022, 16 pages.

EP OA dated Feb. 21, 2026 from Corresponding EP Appln. No. 22747430.1 (7 pages).

* cited by examiner

HYDRAULIC VALVES

CROSS-REFERENCE TO RELATED APPLICATIONS

This application is a National Stage Application of PCT/IB2022/056354 filed Jul. 8, 2022, which claims the benefit of and priority to Indian Provisional Application No. 202111030832, filed Jul. 9, 2021, which applications are hereby incorporated herein by reference. To the extent appropriate, a claim of priority is made to each of the above-disclosed applications.

BACKGROUND

The present disclosure relates generally to hydraulic valves having improved flow characteristics and operational control.

Hydraulic systems are utilized for powering and controlling hydraulic actuators such as hydraulic cylinders. Such hydraulic systems typically include hydraulic components such as tanks or reservoirs, pumps, controllers, and valves for controlling hydraulic fluid flow to and from the hydraulic cylinder. Hydraulic cylinders powered and controlled by hydraulic systems are known to be used to drive mechanical components integrated as part of off-road equipment, such as, but not limited to, construction equipment and agricultural equipment.

SUMMARY

Aspects of the present disclosure relate to a hydraulic valve including: a cage having a first end and an opposite second end defining a longitudinal axis, the cage defining a first port configured to be coupled in fluid communication with a pump, a second port configured to be coupled to a tank, and a third port configured to be coupled to a hydraulic actuator, wherein the third port is disposed between the first port and the second port along the longitudinal axis: a first poppet biased relative to the first end of the cage, the first poppet movable along the longitudinal axis relative to the first port: a second poppet biased relative to the second end of the cage, the second poppet movable along the longitudinal axis relative to the second port: an actuator; and a connecting rod extending along the longitudinal axis, the connecting rod coupled to the actuator and both of the first poppet and the second poppet, wherein the actuator is configured to move the connecting rod along the longitudinal axis such that in a first position, the first poppet at least partially opens the first port so the first port is in fluid communication with the third port, and in a second position, the second poppet at least partially opens the second port so the second port is in fluid communication with the third port.

In an example, a first valve seat is defined in an inner surface of the cage between the first port and the third port, the first valve seat having a first oblique surface configured to engage with the first poppet, and the first poppet has a first square shoulder configured to engage with the first oblique surface to close the first port.

In another example, a second valve seat is defined in the inner surface of the cage between the second port and the third port, the second valve seat having a second oblique surface configured to engage with the second poppet, and the second poppet has a second square shoulder configured to engage with the second oblique surface to close the second port.

In yet another example, one or more of the first and second poppets include a poppet body having an outer surface that faces the cage and an opposite inner surface, the poppet body having one or more flow channels extending between the outer surface and the inner surface.

In still another example, the one or more flow channels at the outer surface are positioned proximate a valve seat of the cage when the poppet body in in a closed configuration.

In an example, one or more of the first and second poppets include a poppet body having a central opening configured to at least partially receive the connecting rod, the poppet body also having a notch defined in a valve face and coaxially aligned with the central opening.

In another example, the connecting rod includes a collar configured to engage with the valve face and selectively move the poppet body, the collar aligned along the longitudinal axis with the notch, and the central opening, and the collar, the notch, and the central opening are configured to allow fluid flow between fluid volumes defined on either axial side of the poppet body.

In yet another example, the connecting rod includes a first collar configured to engage the first poppet and a second collar configured to engage the second poppet, the first collar and the second collar spaced apart along the longitudinal axis and disposed between the first poppet and the second poppet within the cage.

In still another example, the actuator includes a first actuator and a second actuator, and the connecting rod includes a first connecting rod and a second connecting rod. The first actuator is configured to drive movement of the first connecting rod towards the first position and control of the first poppet, and the second actuator is configured to drive movement of the second connecting rod towards the second position and control of the second poppet.

In an example, the connecting rod has a first end coupled to the actuator and an opposite second end coupled to the second poppet, the hydraulic valve further including a pilot poppet attached to the second end of the connecting rod.

In another example, a plug is secured to the second end of the cage, the plug defining a pilot seat.

In yet another example, the plug defines a fourth port in fluid communication with the pilot seat, and when the connecting rod is in the first position, the pilot poppet at least partially opens the forth port.

In still another example, the pilot poppet is biased relative to the connecting rod.

In an example, an actuator housing includes an exterior threaded portion for securing the hydraulic valve within a valve manifold.

In another example, the actuator is one of a solenoid, an electric motor, or a mechanical lever.

In another aspect, the technology relates to a hydraulic valve including: a cage extending along a longitudinal axis and defining an inlet port configured to be connected to a pump, a working port configured to be connected to a hydraulic actuator, and a tank port configured to be connected to a tank: an inlet poppet moveable along the longitudinal axis and configured to selectively seal the inlet port: a tank poppet movable along the longitudinal axis and configured to selectively seal the tank port; and a linear actuator; and a connecting rod coupled to the linear actuator and extending between the inlet poppet and the tank poppet, wherein the linear actuator is configured to drive the connecting rod along the longitudinal axis between at least an inlet configuration whereby the inlet poppet is engaged and a first flow path is defined between the inlet port and the working port, a closed configuration whereby both of the inlet poppet and the tank poppet are disengaged and the inlet port and the tank port are closed, and a tank configuration whereby the outlet poppet is engaged and a second flow path is defined between the tank port and the working port.

In an example, the inlet poppet is biased relative to the cage and the tank poppet is biased relative to the cage, the inlet poppet and the tank poppet biased in opposite directions along the longitudinal axis.

In another example, one or more of the inlet poppet and the outlet poppet include a poppet body having a first axial surface area and an opposite second axial surface area, the first axial surface area being equal to the second axial surface area.

In yet another example, one or more of the inlet poppet and the outlet poppet include a poppet body having an outer surface facing the cage and an opposite inner surface, and at least one flow channel is defined within the poppet body and extends between the outer surface and the inner surface.

In still another example, one or more of the inlet poppet and the outlet poppet include a poppet body having an outer surface facing the cage, and a sealing member is disposed between the outer surface and the cage.

In an example, a pilot valve is disposed proximate the tank port, the pilot valve including: a pilot poppet coupled to the connecting rod, the pilot poppet is biased relative to the connecting rod; and a valve seat formed at a distal end of the cage, and when the connecting rod is in the tank configuration, the pilot valve is closed and seated with the valve seat.

In another aspect, the technology relates to a hydraulic valve including: a cage defining a longitudinal axis, the cage defining a first port and a second port: a poppet disposed within the cage and biased along the longitudinal axis, the poppet having a first axial face and an opposite second axial face, one or more flow channels extending between the first and second axial faces; an actuator; and a connecting rod extending along the longitudinal axis, the connecting rod coupled to the actuator and the poppet, where the actuator is configured to move the connecting rod along the longitudinal axis so as to at least partly open the first port.

In an example, the second axial face is orthogonal relative to the longitudinal axis.

In another example, the actuator is one of a solenoid, an electric motor, or a mechanical lever.

In yet another example, the first port is orthogonal relative to the second port.

In still another example, the hydraulic valve is either a proportional valve or an on/off valve.

In an example, the hydraulic valve includes a position sensor configured to monitor a position of the connecting rod along the longitudinal axis.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

The hydraulic valves described herein have a cage and poppet arrangement with a connecting rod attached to a movement actuator. The valve has two independent metering poppets to control fluid flow from an inlet port to a working port and the working port to a tank port as required or desired. The poppets are spring loaded to a closed configuration that block the inlet port and tank port such that fluid flow is prevented through the working port. The connecting rod has a collar proximate each poppet to facilitate actuation of the poppets. When the actuator moves the connecting rod towards the inlet port, the inlet side collar pushes the inlet poppet and overcomes the spring force to open the area between the inlet port and the working port, and which is proportional to an input command of the actuator. When the connecting rod is returned to the closed configuration (e.g., a neutral position that disengages the poppets), the inlet poppet is pushed back to its seat by the spring. Similarly, when the actuator moves the connecting rod towards the tank port, the tank side collar pushes the tank poppet and overcomes the spring force to open the area between the tank port and the working port, and which is proportional to an input command of the actuator. When the connecting rod is returned to the closed configuration, the tank poppet is pushed back to its seat by the spring.

In the examples described herein, a poppet body of the poppets has a 1:1 axial area ratio so that pressurized fluid from the inlet port is sensed in a spring chamber of both the poppets and the pressure forces across the body of the poppets get canceled. Due to the additional spring force of the spring, the poppets are seated on the seat at all times, except for when actuated by the actuator and connecting rod. The poppet body is also configured to control fluid flow within the cage. A flow passage is formed within the poppet body that extends between the spring chamber and valve seat so that fluid pressure forces within the valve are more efficiently balanced during operation and poppet position is controlled through the position of the connecting rod/actuator.

As used herein, the terms "axial" and "longitudinal" refer to directions and orientations, which extend substantially parallel to a centerline of the hydraulic valve. Moreover, the terms "radial" and "radially" refer to directions and orientations, which extend substantially perpendicular to the centerline of the hydraulic valve. In addition, as used herein, the terms "circumferential" and "circumferentially" refer to directions and orientations, which extend arcuately about the centerline of the hydraulic valve.

Figure 1:
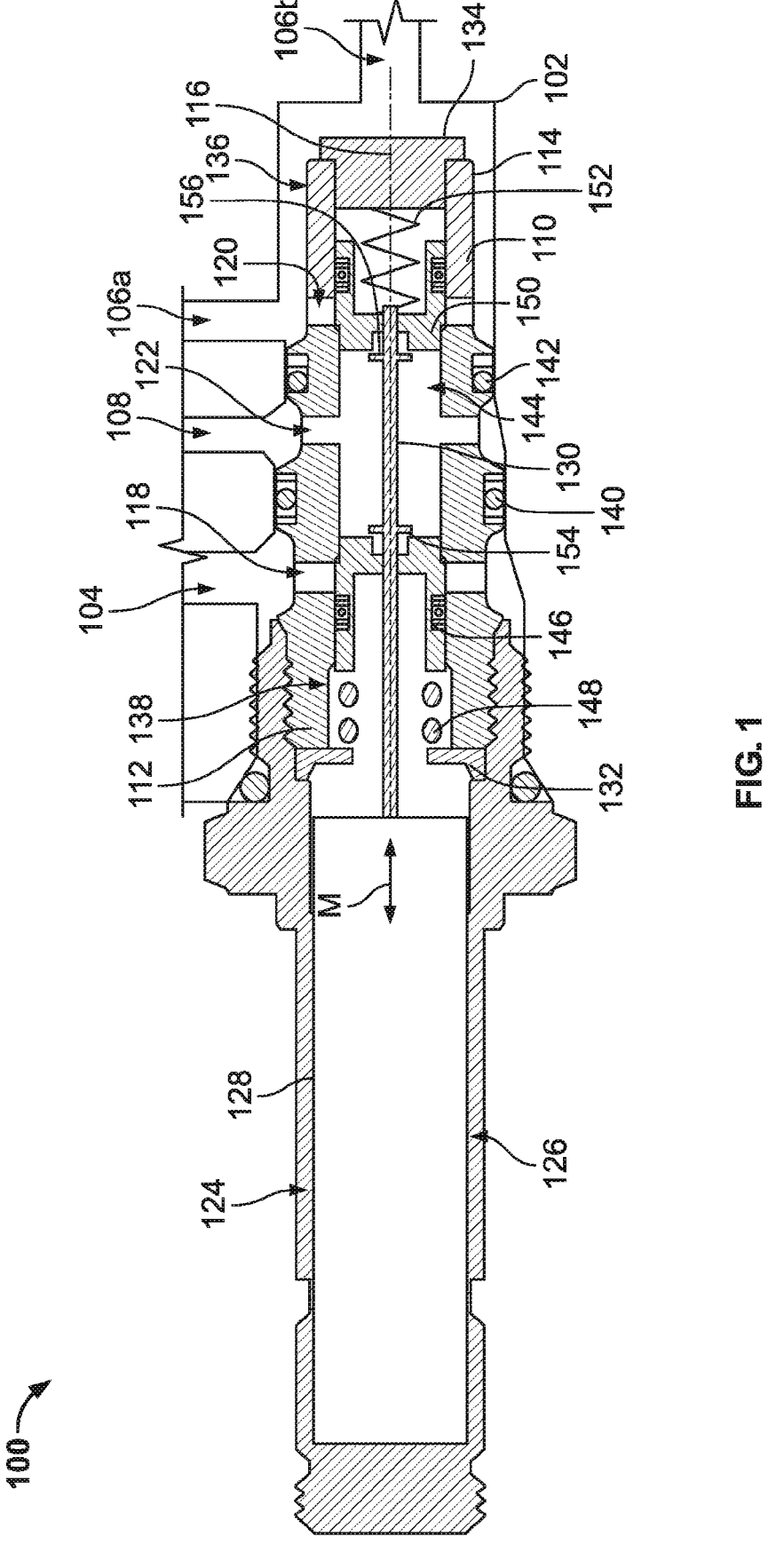
FIG. 1 is a schematic view of an exemplary hydraulic valve in accordance with the principles of the present disclosure.

FIG. 1 is a schematic view of an exemplary hydraulic valve 100 in accordance with the principles of the present disclosure. The hydraulic valve 100 is configured to be coupled to a valve manifold 102 of a hydraulic system and at least partially control hydraulic fluid flow therethrough. In the example, the valve manifold 102 defines an inlet flow channel 104 that is positioned downstream of a pump (not shown) and is configured to receive a flow of pressurized hydraulic fluid. A tank flow channel 106 is positioned upstream of a tank or reservoir (not shown) and is configured to direct a flow of hydraulic fluid towards the tank. A working flow channel 108 is in fluid communication with a hydraulic actuator (not shown) and is configured to receive or direct hydraulic fluid flow so as to drive operation of the actuator. In an aspect, the hydraulic actuator is a hydraulic cylinder. In another aspect, the hydraulic actuator is a rotary actuators, such as, but not limited to hydraulic motors.

The hydraulic valve 100 includes a valve cage 110 having a first end 112 and an opposite second end 114 defining a longitudinal axis 116. The valve cage 110 defines an inlet port 118 that couples in fluid communication with the inlet flow channel 104 of the valve manifold 102 so that pressurized hydraulic fluid can be received at the valve 100. A tank port 120 is defined in the valve cage 110 that couples in fluid communication to the tank flow channel 106 so that hydraulic fluid can be channeled towards the tank. A working port 122 is defined in the valve cage 110 that couples in fluid communication to the working flow channel 108 so that hydraulic fluid can be channeled towards the hydraulic actuator or be received from the hydraulic actuator at the hydraulic valve 100. In the example, the working port 122 is disposed between the inlet port 118 and the tank port 120 along the longitudinal axis 116. In an aspect, the ports 118, 120, 122 and the corresponding flow channels 104, 106a, 108 extend radially from the longitudinal axis 116. In an example, the tank flow channel 106b may extend axially relative to the longitudinal axis 116 as required or desired. In aspects, the tank flow channel 106 may include two flow channels 106a, 106b as required or desired. The hydraulic valve 100 may be considered a three-way, three-position type valve.

The first end 112 of the valve cage 110 is configured to couple to an actuator assembly 124. In the example, the actuator assembly 124 includes a housing 126, an actuator 128, and a connecting rod 130. In an aspect, the first end 112 is threadably coupled to the housing 126, and the housing 126 is configured to couple to the valve manifold 102 (e.g., via a threaded connection). In an aspect, the hydraulic valve 100 is a screw-in cartridge type valve. The housing 126 also holds the actuator 128 that couples to the connecting rod 130 which extends along the longitudinal axis 116. The actuator 128 is configured to move M the connecting rod 130 along the longitudinal axis 116. In an aspect, the actuator 128 is a push-pull solenoid that drives linear movement M of the connecting rod 130, however, it should be appreciated that the actuator 128 can be any other type of movement generating device that enables the connecting rod 130 to operate as described herein, for example, an on/off or proportional solenoid, an electric motor, or a mechanical lever operated actuator. In another aspect, the actuator 128 may be a manual lever or other type of manual actuation of the connecting rod 130 as required or desired. A washer 132 can be disposed between the first end 112 and the housing 126 either through a threaded joint, press fit joint, or any other method as required or desired. A plug 134 is coupled to the second end 114 of the valve cage 110.

The valve cage 110 includes a radially outer surface 136 and an opposite radially inner surface 138. The outer surface 136 includes a pair of fluid seals 140, 142 that engage with the valve manifold 102 and keep hydraulic fluid flow separated between the three ports 118, 120, 122. The inner surface 138 defines an interior valve chamber 144 that holds a plurality of valve components that enable operation of the hydraulic valve 100 as described herein.

An inlet poppet 146 is disposed proximate the first end 112 of the cage 110. The inlet poppet 146 is moveable along the longitudinal axis 116 relative to the inlet port 118 so as to selectively open and close the inlet port 118. The inlet poppet 146 is biased by a spring 148 relative to the first end 112 and towards the second end 114 of the cage 110 such that the inlet poppet 146 is biased towards a closed configuration and sealing the inlet port 118. In the example, the spring 148 is seated on the washer 132. A tank poppet 150 is disposed proximate the second end 114 of the cage 110. The tank poppet 150 is movable along the longitudinal axis 116 relative to the tank port 120 so as to selectively open and close the tank port 120. The tank poppet 150 is biased by a spring 152 relative to the second end 114 and towards the first end 112 of the cage 110 such that the tank poppet 150 is biased towards a closed configuration and sealing the tank port 120. In the example, the spring 152 is seated on the plug 134.

The closed configuration of the inlet poppet 146 and the tank poppet 150 is illustrated in FIG. 1. As such, hydraulic fluid flow through the hydraulic valve 100 is prevented and flow either into the hydraulic actuator or out of the hydraulic actuator is prevented via the working port 122. In the example, the inlet poppet 146 and the tank poppet 150 are biased in opposite directions along the longitudinal axis 116 so that the poppets 146, 150 automatically return to the closed configuration when the force applied by the connecting rod 130. As such, the closed configuration is also a natural position of the connecting rod 130 that is driven by the actuator assembly 124. The inlet poppet 146 and the tank poppet 150 are independently operable from one another.

The connecting rod 130 is coupled to the actuator 128 and extends along the longitudinal axis 116 so that the connecting rod 130 is coupled to both of the inlet poppet 146 and the tank poppet 150. The connecting rod 130 includes an inlet collar 154 configured to engage with the inlet poppet 146 and a tank collar 156 configured to engage with the tank poppet 150. The inlet collar 154 and the tank collar 156 are spaced apart from one another on the connecting rod 130 and along the longitudinal axis 116. Additionally, the collars 154, 156 are disposed between the inlet poppet 146 and the tank poppet 150 within the cage 110. In an example, the collars 154, 156 can be integrally formed with the rod 130 so that their position is fixed on the rod 130. In another example, at least a portion of the connecting rod 130 may be externally threaded and the collars 154, 156 are threaded thereon. In this example, the axial position of the collars 154, 156 on the connecting rod 130 can be adjustable so as to control a distance of the collars 154, 156 with respect to the poppets 146, 150 and the fluid flow through the poppets.

Figure 2:
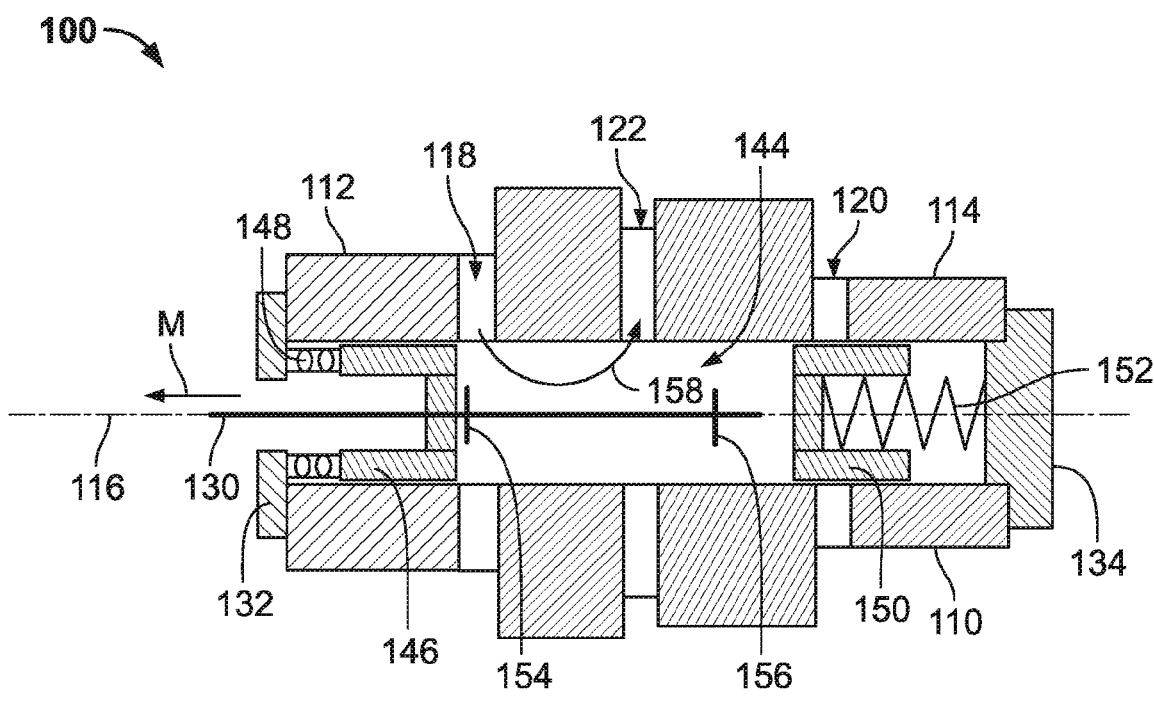
FIG. 2 is a schematic view of the hydraulic valve in an inlet configuration.
Figure 3:
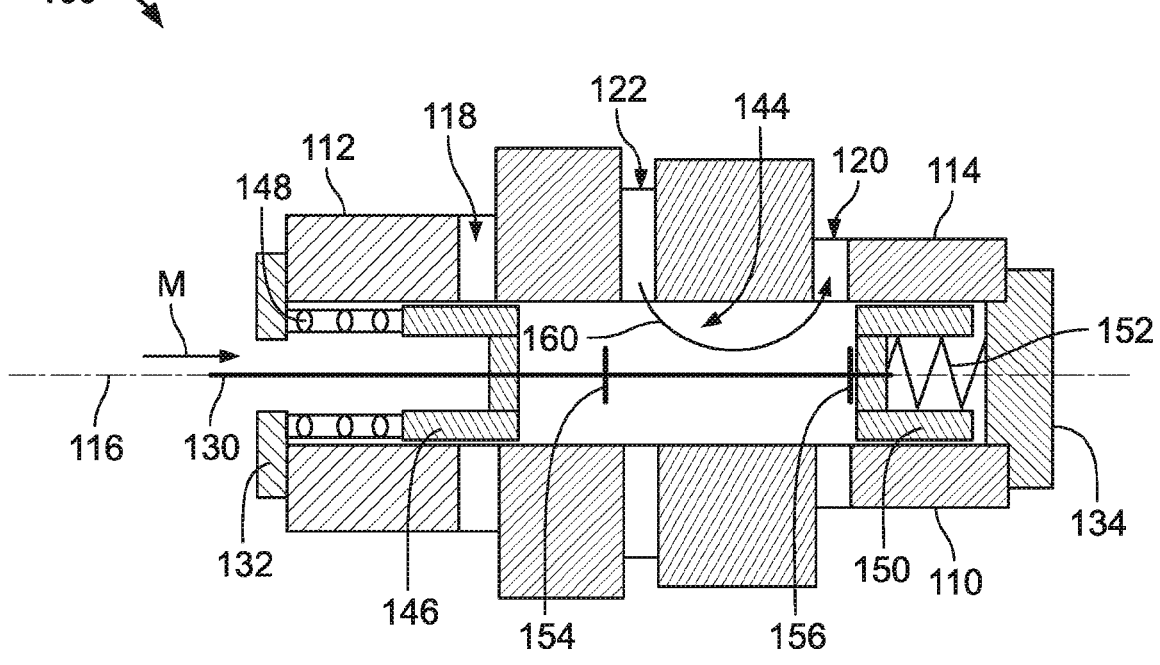
FIG. 3 is a schematic view of the hydraulic valve in a tank configuration.

In operation, the actuator 128 is configured to selectively move the connecting rod 130 along the longitudinal axis 116 so that the hydraulic valve 100 can move between at least a closed configuration as shown in FIG. 1, an inlet configuration (shown in FIG. 2) and a tank configuration (shown in FIG. 3). In the closed configuration, the connecting rod 130 is not engaged with either poppet 146, 150 so that the poppets 146, 150 close their respective ports 118, 120 and hydraulic fluid flow through the hydraulic valve 100 is prevented. In the closed configuration, the collars 154, 156 of the connecting rod 130 are positioned between the poppets 146, 150 without depressing either poppet. In the inlet configuration, the connecting rod 130 engages the inlet poppet 146 so that the inlet port 118 is at least partially opened and hydraulic fluid flow can enter the valve 100 through the inlet port 118 and exit through the working port 122. In the tank configuration, the connecting rod 130 engages the tank poppet 150 so that the tank port 120 is at least partially opened and hydraulic fluid flow can enter the valve 100 through the working port 122 and exit through the tank port 120. Additionally, the poppet that is not engaged by the connecting rod 130 is biased as to automatically close, and as such, both of the poppets 146, 150 can move at approximately the same time so that regeneration can be achieved as described herein. The inlet configuration and the tank configuration are described further below in reference to FIGS. 2-3.

The hydraulic valve 100 may be either a proportional valve or an on/off valve as required or desired. For a proportional valve, the poppets are configured to be positionable not only in a completely on or off position so as to allow a full flow or no flow, but may also be positionable in one or more intermediate positions so as to allow for an intermediate flow. Alternatively, for an on/off valve, the poppets are configured to be positionable only in a completely on or off position so as to only allow a full flow or no flow. As described further below; certain poppet configurations can increase performance of the proportional valve or the on/off valve.

FIG. 2 is a schematic view of the hydraulic valve 100 in an inlet configuration. Certain components are described above, and thus, are not necessarily described further. In the inlet configuration, the connecting rod 130 is moved M (e.g., via the actuator 128 shown in FIG. 1) along the longitudinal axis 116 towards the first end 112 of the cage 110 so that the inlet collar 154 engages the inlet poppet 146. When the connecting rod 130 engages the inlet poppet 146 via the inlet collar 154, the bias of the spring 148 is overcome and the inlet poppet 146 is depressed towards the first end 112 so that the inlet port 118 is at least partially opened with respect to the working port 122. Once the inlet port 118 is opened, the inlet port 118 is placed in fluid communication with the working port 122 with an inlet flow path 158 defined within the interior valve chamber 144 and so that fluid flow is enabled between the inlet port 118 and the working port 122. The tank poppet 150 remains biased in the closed configuration because the tank collar 156 is positioned away from the poppet 150 and biased via the spring 152 so that the tank port 120 is sealed and flow therethrough is prevented.

FIG. 3 is a schematic view of the hydraulic valve 100 in a tank configuration. Certain components are described above, and thus, are not necessarily described further. In the tank configuration, the connecting rod 130 is moved M (e.g., via the actuator 128 shown in FIG. 1) along the longitudinal axis 116 towards the second end 114 of the cage 110 so that the tank collar 156 engages the tank poppet 150. When the connecting rod 130 engages the tank poppet 150 via the tank collar 156, the bias of the spring 152 is overcome and the tank poppet 150 is depressed towards the second end 114 so that the tank port 120 is at least partially opened. Once the tank port 120 is opened, the tank port 120 is placed in fluid communication with the working port 122 with a tank flow path 160 defined within the interior valve chamber 144 and so that fluid flow is enabled between the working port 122 and the tank port 120. The inlet poppet 146 remains biased in the closed configuration because the inlet collar 154 is positioned away from the poppet 146 and biased via the spring 148 so that the inlet port 118 is sealed and flow therethrough is prevented.

Figure 4:
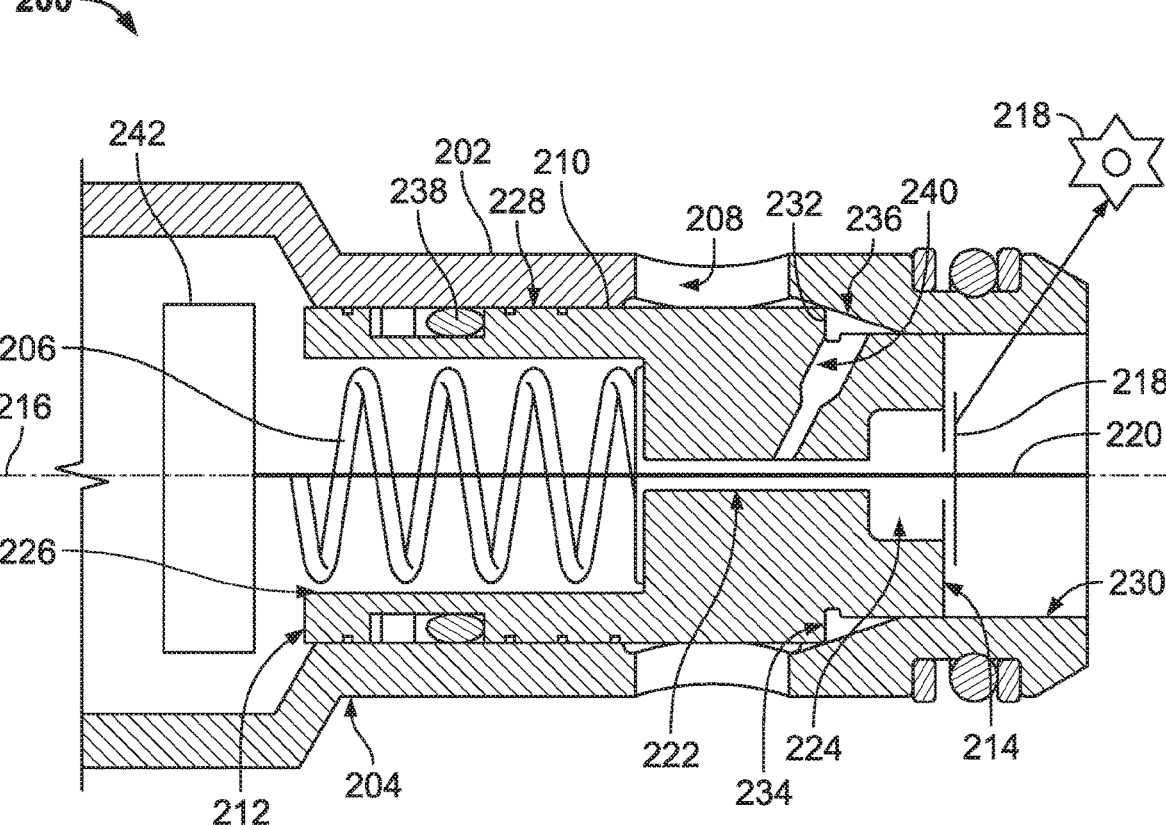
FIG. 4 is an enlarged view of a poppet for the hydraulic valve shown in FIGS. 1-3.

FIG. 4 is an enlarged view of a poppet 200 for the hydraulic valve 100 (shown in FIGS. 1-3). The poppet 200 can be either the inlet poppet 146 or the tank poppet 150 (both shown in FIGS. 1-3), and in the example, both poppets 146, 150 can have the same or similar structure. The poppet 200 is biased within a cage 202 and proximate to an end 204 of the cage 202. A compression spring 206 biases the poppet 200 towards a closed configuration (as illustrated) with respect to a port 208 defined within the cage 202. The poppet 200 includes a poppet body 210 having a first axial face 212 and an opposing second axial face 214 disposed about a longitudinal axis 216. The first axial face 212 engages with the spring 206 and the second axial face 214 engages with a collar 218 of a connecting rod 220. A central opening 222 is defined within the poppet body 210 and extends between the first axial face 212 and the second axial face 214. The central opening 222 is configured to at least partially receive the connecting rod 220. In the example, a notch 224 is defined in the second axial face 214 and is coaxially aligned with the central opening 222. The notch 224 is radially larger than the central opening 222. The central opening 222 and the notch 224 at least partially define an inner radial surface 226 of the poppet body 210 relative to the longitudinal axis 216.

The poppet body 210 also includes an outer radial surface 228 that faces an inner surface 230 of the cage 202. The outer surface 228 of the poppet body 210 includes a shoulder 232 proximate the first axial face 212 that is configured to engage with a valve seat 234 formed on the inner surface 230 of the cage 202. In the example, the shoulder 232 includes a 90° step (e.g., square) and the valve seat 234 includes an oblique surface 236. The spring 206 urging the shoulder 232 towards the valve seat 234 closes the poppet 200 and a valve seal is formed proximate the first axial face 212. A sealing member 238 (e.g., an O-ring or the like) is disposed proximate the second axial face 214 so that a valve seal is also formed between the cage 202 and the poppet body 210 at the other axial side of the port 208. As such, the poppet body 210 forms one fluid volume on its spring side (e.g., at least partially within the spring chamber) and another fluid volume on the notch side.

In the example, one or more flow channels 240 are defined in the poppet body 210 and extend from the outer surface 228 to the inner surface 226. The flow channel 240 enables a portion of hydraulic fluid to flow between the inner and outer surfaces 226, 228 of the poppet body 210 (e.g., between the two fluid volumes defined by the poppet body) when the poppet 200 is opening or closing so that fluid force on either side of the poppet 200 is more quickly equalized. As such, the flow channel 240 facilitates keeping the poppet body 210 in equilibrium when there is a pressure gradient during operation of the poppet 200 and equalizes force on the poppet body 210 from both sides. This allows for larger size poppets 200 to be controlled by smaller forces generated by an actuator 242 acting on the connecting rod 220.

Additionally, large pressure forces accumulated within one fluid volume of the poppet 200 will be reduced and undesirable position shifts of the poppet body 210 are restricted or prevented.

In an aspect, the flow channel 240 is positioned proximate the shoulder 232 on the end extending from the outer surface 228, and thus, also proximate the valve seat 234 when the poppet body 210 in in the closed configuration. The flow channel 240 is also positioned proximate the central opening 222 on the end extending from the inner surface 226. In another example, the flow channel 240 can be positioned proximate the spring chamber holding the spring 206. The flow channel 240 extends substantially radially within the poppet body 210 relative to the longitudinal axis 216. In an aspect, the flow channel 240 can be axially angled with the outer surface end closer to the second axial face 214 than the inner surface end of the channel 240. The flow channel 240 can have a size that is not constant through its length as illustrated in FIG. 4. Additionally or alternatively, the flow channel 240 can have a constant size along its length. Two or more flow channels 240 circumferentially spaced around the longitudinal axis 216 can be used as required or desired.

In the example, the connecting rod 220 and the collar 218 do not form a fluid seal with the central opening 222 and the notch 224. As such, hydraulic fluid is allowed to flow between the first axial face 212 of the poppet body 210 and the second axial face 214 and between the two fluid volumes. This configuration increases control of the fluid flow when opening and closing the poppet 200. The collar 218 is configured to directly engage the second axial face 214 so as depress the poppet body 210 along the longitudinal axis 216 and control flow through the port 208. The collar 218 is aligned along the longitudinal axis 216 with the central opening 222 and the notch 224 and has a different shape than the notch 224 so that fluid can flow therebetween when the collar 218 engages with the second axial face 214. In an aspect, the collar 218 can include a star-like shape, however, other shapes (e.g., triangle, square, gear shaped, etc.) are also contemplated herein. In other aspects, the collar 218 can include slots and/or apertures that allow fluid flow to pass between axial sides of the collar. The notch 224 has a cylinder-type shape and the shape of the notch 224 at least partially controls the flow of fluid through the poppet 200 and increases the positioning performance of the poppet body 210 within the cage 202. For example, the notch 224 are provided to gain smooth area opening when the poppet 200 lifts from the seat 234. In aspects, the notch 224 can have a rectangular, conical, frustoconical, or any other type of shape as required or desired. By including the notch 224 in the poppet 200, the hydraulic valve can have increased performance with respect to being a proportional valve. In other examples, the poppet 200 may not include a notch as required or desired, for example, for an on/off valve configuration.

Because hydraulic fluid is allowed to flow between the first axial face 212 and the second axial face 214 of the poppet body 210 and between opposing fluid volumes, the first axial face 212 has a surface area that is equal to a surface area of the second axial face 214 so that equal fluid pressure is applied to both axial sides of the poppet body 210, and the position of the poppet body 210 is completely controlled by the connecting rod 220 actuated by the actuator 246 acting against the spring 206.

Figure 5:
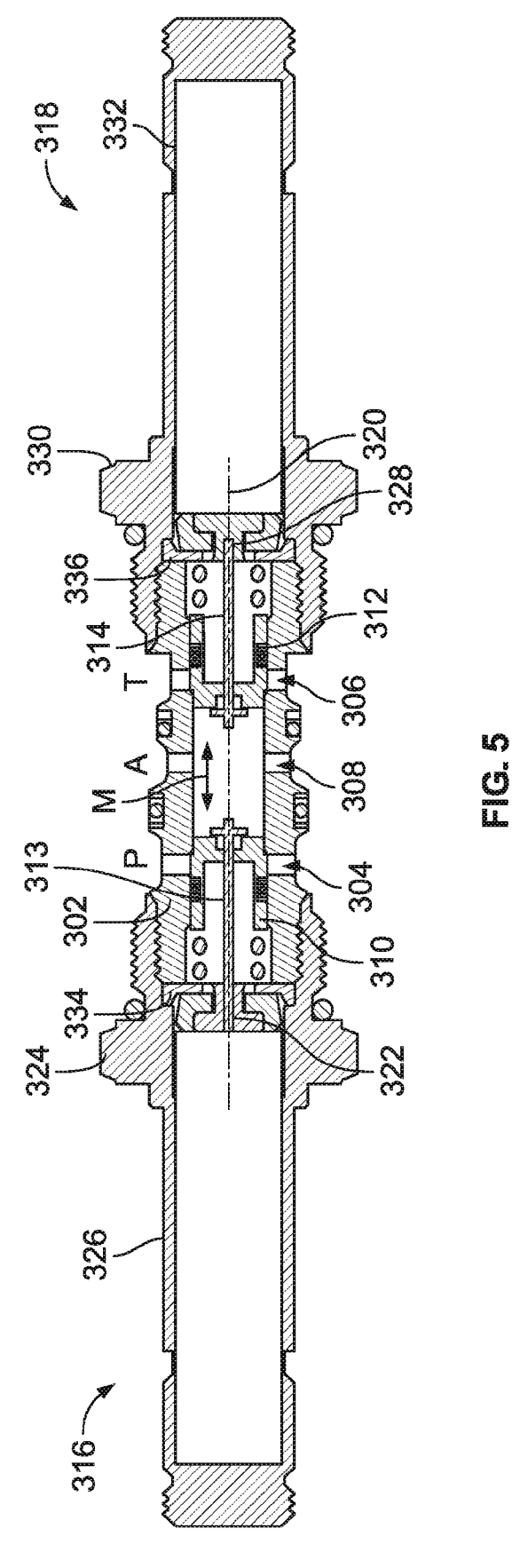
FIG. 5 is a schematic view of another hydraulic valve.

FIG. 5 is a schematic view of another hydraulic valve 300. The hydraulic valve 300 includes a cage 302 defining an inlet port 304, a tank port 306, and a working port 308 with a inlet poppet 310 and a tank poppet 312 and similar to the example described above in reference to FIGS. 1-4. In this example, however, two discrete connecting rods 313, 314 couple respectively to the inlet poppet 310 and the tank poppet 312, and couple to two separate actuator assemblies 316, 318. The connecting rods 313, 314 extend along a longitudinal axis 320 with one end 322 of the connecting rod 313 coupled to a first actuator assembly 316 having an actuator housing 324 and a first actuator 326. The connecting rod 313 is also coupled to the inlet poppet 310. An end 328 of the connecting rod 314 is coupled to a second actuator assembly 318 having an actuator housing 330 and a second actuator 332. The connecting rod 314 is also coupled to the tank poppet 312.

In this example, the individual inlet and tank poppets 310, 312 can be unseated by the respective first and second actuators 326, 332, and along the longitudinal axis 320. The actuators 326, 332 are configured to work together to drive movement M of the connecting rods 313, 314 and operation of the hydraulic valve 300 as described herein. As illustrated in FIG. 5, the hydraulic valve 300 is positioned in a closed configuration, whereby the inlet port 304 and the tank port 306 are both closed by their respective poppets 310, 312. To drive the connecting rod 313 into a first position and at least partially open the inlet port 304, the first actuator 326 pulls the connecting rod 313 to control the position of the inlet poppet 310 and so that the hydraulic valve 300 is moved towards an inlet configuration. To drive the connecting rod 314 in the opposite direction and into a second position to at least partially open the tank port 306, the second actuator 332 pulls the connecting rod 314 to control the position of the tank poppet 312 and so that the hydraulic valve 300 is moved towards a tank configuration. It should be appreciated, that the first and second actuators 326, 332 are also used to move the connecting rods 313, 314 towards the closed configuration. By using two separate actuators 326, 332, larger poppets 310, 312 and higher hydraulic flow conditions can be accommodated as larger driving forces are required or desired.

The actuators 326, 332 are configured to move M the connecting rods 313, 314 along the longitudinal axis 320. In an aspect, each actuator 326, 332 are pull solenoids that drive linear movement M of the connecting rods 313, 314 in one direction only. It should be appreciated, however, that the actuators 326, 332 can be any other type of movement generating device, including manual devices or electric motors, that enables the connecting rods 313, 314 to operate as described herein. Washers 334, 336 are disposed between the ends of the cage 302 and the actuator housings 324, 330.

As illustrated in FIG. 5, the connecting rods 313, 314 are separate components that are each coupled to the first actuator 326 or the second actuator 332. The actuators 326, 332 are able to independently drive position of the two piece connecting rod and enable operation of the hydraulic valve 300 as described herein. Additionally or alternatively, both of the actuators 326, 332 are able to operate the respective poppets 310, 312, via the two piece connecting rod, simultaneously as required or desired. In other examples, the connecting rods 313, 314 may be formed as a single piece component, with one end being connected to the first actuator 326 and the other end being connected to the second actuator 332.

Figures 6, 7:
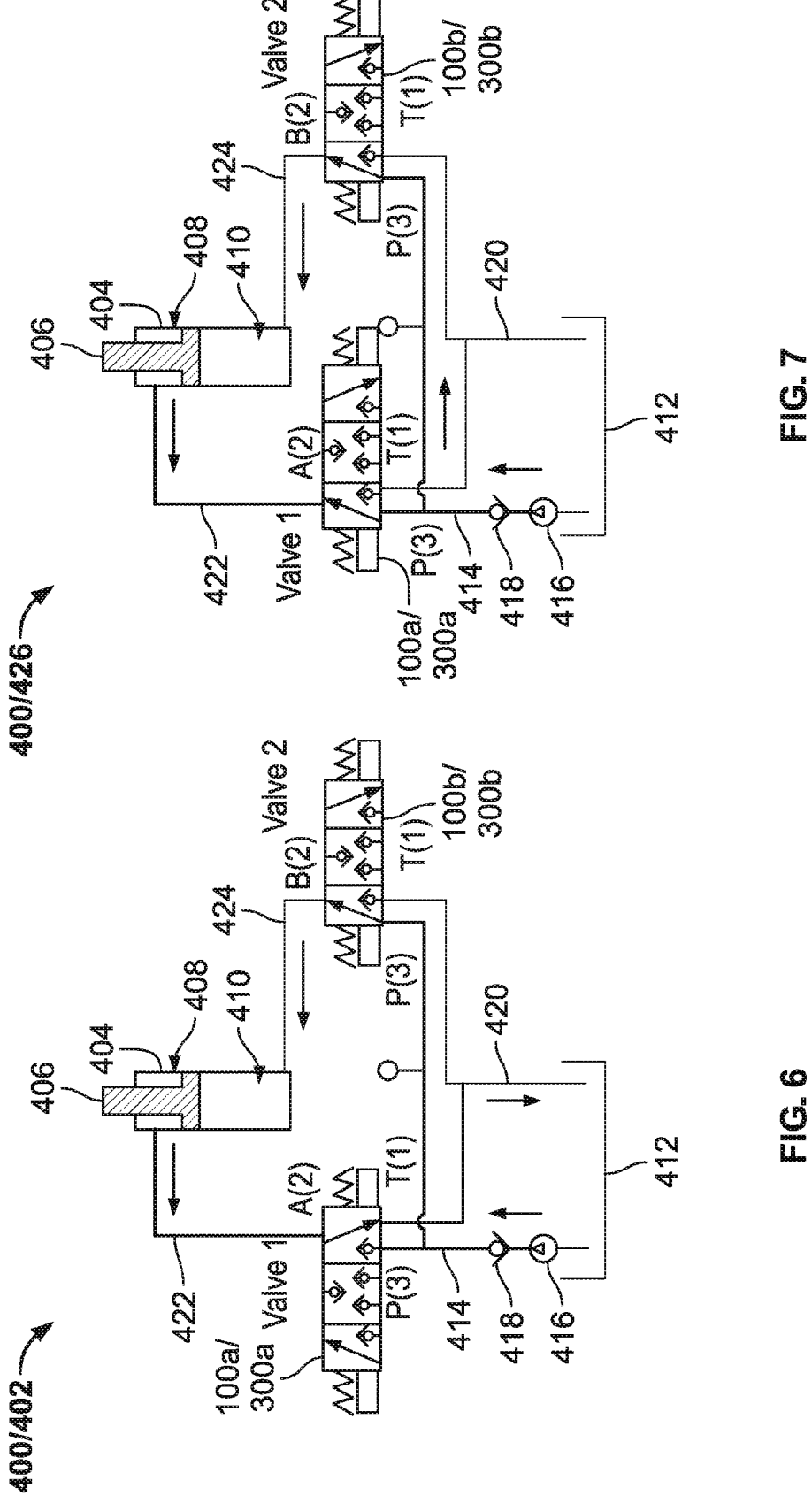
FIG. 6 is a schematic view of a hydraulic circuit in a cylinder raising configuration.
FIG. 7 is a schematic view of the hydraulic circuit shown in FIG. 6 in a cylinder raising configuration with regeneration.

FIG. 6 is a schematic view of a hydraulic circuit 400 in a cylinder raising configuration 402. In some known hydraulic circuits (not shown) that control hydraulic fluid flow in and out of a hydraulic cylinder, four cartridge valves are utilized. In these known circuits, this configuration also requires two controllers, as each controller can control only two cartridge valves at a time. Additionally, two inlet check valves and two shuttle valves are used: all of which adds components, weight, and cost to the hydraulic circuit. By using the hydraulic valves 100, 300 described above, the hydraulic circuit 400 can be simplified while still providing independent metering of hydraulic fluid flow at the valves 100, 300.

In the example, the hydraulic circuit 400 includes a hydraulic cylinder 404 (e.g., hydraulic actuator) having a piston 406 that defines two fluid chambers 408, 410 within the cylinder 404. A hydraulic tank 412 is coupled in flow communication with the cylinder 404 so that hydraulic fluid can selectively drive movement of the piston 406. The tank 412 has a pump line 414 with a pump 416 and a check valve 418 that channels pressurized fluid towards the cylinder 404. The tank 412 also has return line 420 that allows hydraulic fluid to be returned to the tank 412. The hydraulic circuit 400 also includes two hydraulic valves 100*a,b*, 300*a,b* in parallel. By using only two valves 100*a,b*, 300*a,b*, a single controller (not shown) can be used for control of the circuit 400. The pump line 414 and the return line 420 from the tank 412 are both coupled in fluid communication to each of the valves 100*a,b*, 300*a,b*. The pump line 414 couples in fluid communication to the inlet port of the valve since pressurized fluid is provided though the line 414. The return line 420 couples in fluid communication to the tank port of the valve. Each valve 100*a,b*, 300*a,b* is also coupled in fluid communication to the cylinder 404 via a respective cylinder line 422, 424. In the hydraulic circuit 400, the first valve 100*a*, 300*a* is coupled to fluid chamber 408 via cylinder line 422 and the second valve 100*b*, 300*b* is coupled to fluid chamber 410 via cylinder line 424.

As illustrated in FIG. 6, to raise the cylinder 404, hydraulic fluid is pumped into the cylinder chamber 410 via the pump 416. As such, the hydraulic valve 100*b*, 300*b* is moved towards an inlet configuration so that pressurized fluid can be channeled from the pump line 414 through the valve 100*b*, 300*b* and into the cylinder chamber 410 via cylinder line 424. The hydraulic fluid within the other chamber 408 can be returned to the tank 412 during this operation. This is enabled by the hydraulic valve 100*a*, 300*a* being moved to the tank configuration so that fluid can exit chamber 408 via the cylinder line 422, into the valve 100*a*, 300*a*, and into the tank 412 via the return line 420. By utilizing the hydraulic valves 100*a,b*, 300*a,b* described herein, the flow through each valve can be independently metered thereby increase hydraulic flow and control performance through the circuit 400. Additionally, by using the two independent poppets within the valves 100, 300, the hydraulic fluid flow is able to be proportionally controlled.

FIG. 7 is a schematic view of the hydraulic circuit 400 in a cylinder raising configuration with regeneration 426. Certain components are described above, and thus, are not necessarily described further. During regeneration, the piston 406 is still configured to rise, however, the pressurized flow out of the cylinder chamber 408 and into cylinder line 422 is channeled through the hydraulic valve 100*a*, 300*a* so that it is regenerated into the pressurized flow that is channeled through the hydraulic valve 100*b*, 300*b* and back into the other cylinder chamber 410. In some examples, the pump 416 can provide further pressurized fluid as required or desired. In this configuration, the valve 100*a*, 300*a* is moved towards the inlet configuration, which is the same configuration that valve 100*b*, 300*b* is in. Through use of the hydraulic valves 100*a,b*, 300*a,b* only a single inlet check valve 418 is needed to allow regeneration in the system.

Figures 8, 9:
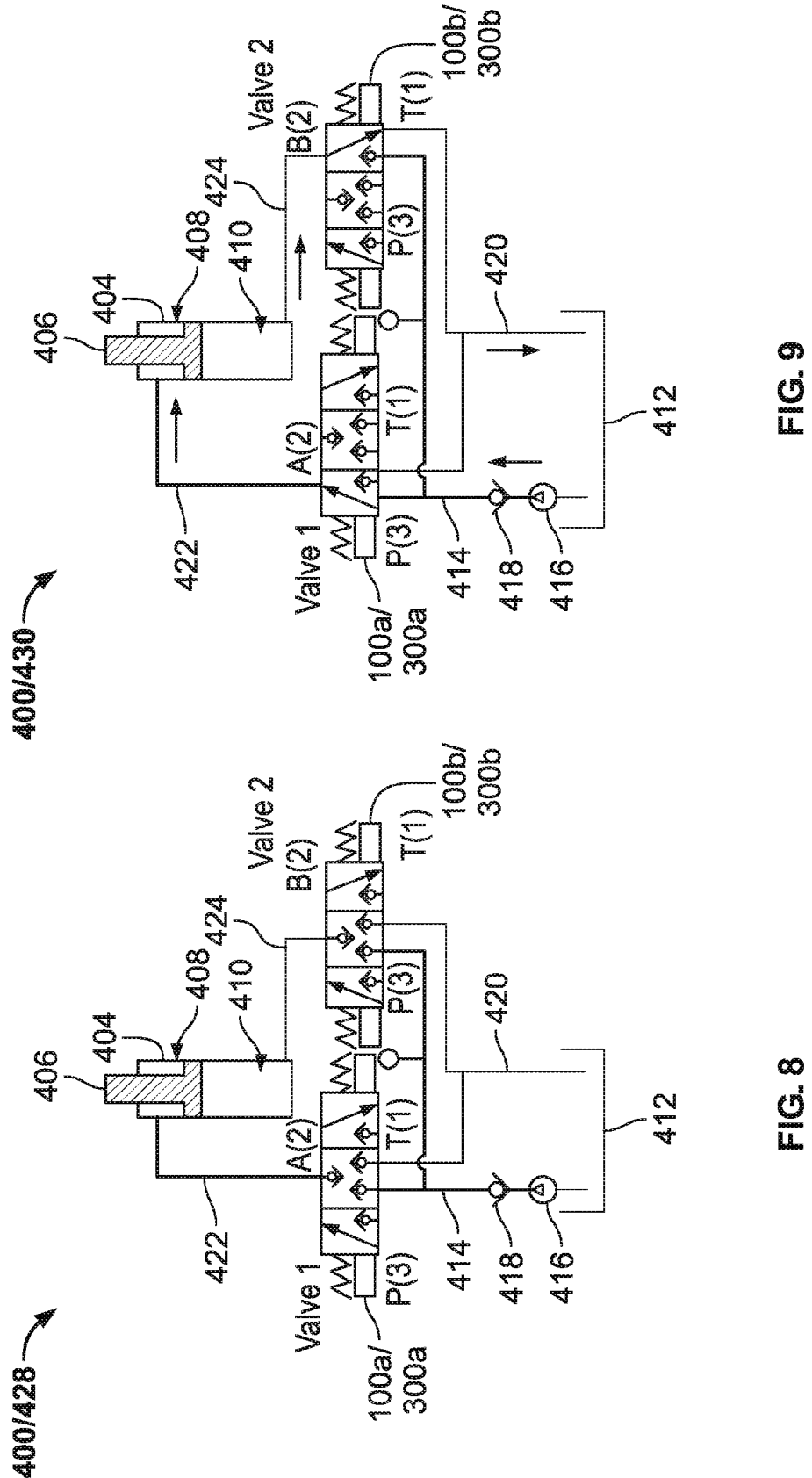
FIG. 8 is a schematic view of the hydraulic circuit shown in FIG. 6 in a load holding configuration.
FIG. 9 is a schematic view of the hydraulic circuit shown in FIG. 6 in a cylinder lowering configuration.

FIG. 8 is a schematic view of the hydraulic circuit 400 in a load holding configuration 428. Certain components are described above, and thus, are not necessarily described further. When the position of the piston 406 is held, hydraulic fluid does not flow in or out of the cylinder chambers 408, 410. As such, hydraulic fluid is configured to not flow within the circuit 400. In this configuration, both of the hydraulic valves 100*a,b*, 300*a,b* are in a closed configuration.

FIG. 9 is a schematic view of the hydraulic circuit 400 in a cylinder lowering configuration 430. Certain components are described above, and thus, are not necessarily described further. In order to lower the cylinder 404, hydraulic fluid is pumped into the cylinder chamber 408 via the pump 416. As such, the hydraulic valve 100*a*, 300*a* is moved towards an inlet configuration so that pressurized fluid can be channeled from the pump line 414 through the valve 100*a*, 300*a* and into the cylinder chamber 408 via cylinder line 422. The hydraulic fluid within the other chamber 410 can be returned to the tank 412 during this operation. This is enabled by the hydraulic valve 100*b*, 300*b* being moved to the tank configuration so that fluid can exit chamber 410 via the cylinder line 424, into the valve 100*b*, 300*b*, and into the tank 412 via the return line 420.

Figure 10:
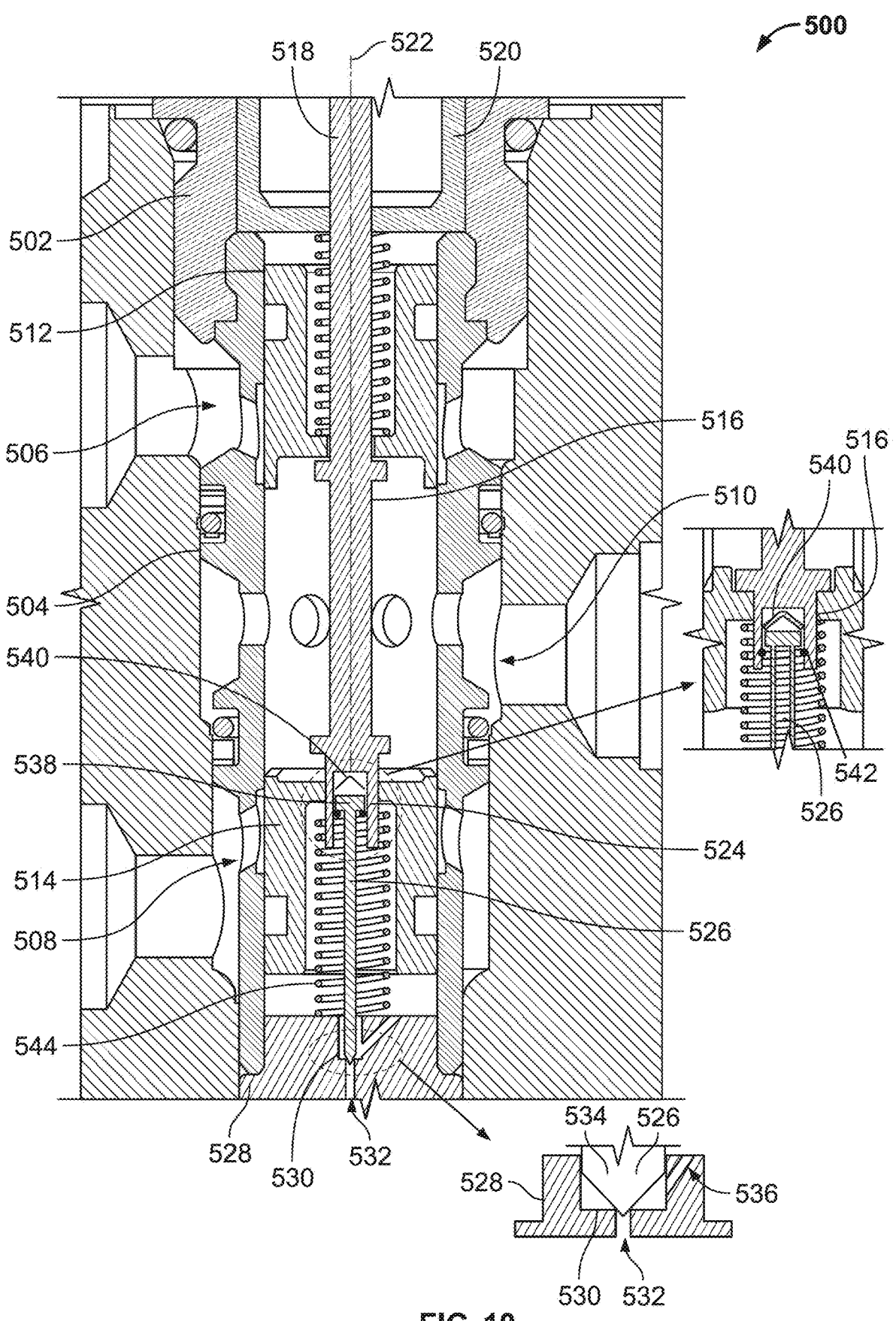
FIG. 10 is a cross-sectional view of another hydraulic valve.

FIG. 10 is a cross-sectional view of another hydraulic valve 500 configured to be mounted within a valve manifold 502. The hydraulic valve 500 includes a cage 504 defining an inlet port 506, a tank port 508, and a working port 510 with a inlet poppet 512 and a tank poppet 514. A connecting rod 516 extends between and couples to the inlet poppet 512 and the tank poppet 514. A first end 518 of the connecting rod 516 is coupled to an actuator 520 that drives linear movement of the connecting rod 516 along a longitudinal axis 522 and similar to the example described above in reference to FIGS. 1-4. The inlet poppet 512 and/or the tank poppet 514 may have the same or similar configuration to the poppet 200 (shown in FIG. 4) and so that the hydraulic valve 500 is a proportional valve. In other aspects, the inlet poppet 512 and/or the tank poppet 514 may have a configuration as described below so that the hydraulic valve 500 is an on/off valve. In this example, however, an opposite second end 524 of the connecting rod 516 includes a pilot poppet 526 and a plug 528 forms a pilot seat 530. The pilot poppet 526 is configured to allow a second flow of hydraulic fluid to be channeled out of the hydraulic valve 500 when in an inlet configuration (e.g., when the inlet poppet 512 opens the inlet port 506) and separate from the hydraulic fluid that is channeled towards the hydraulic actuator (not shown). This second flow of hydraulic fluid through the plug 528 enables for the pressure of the hydraulic fluid flow towards the hydraulic actuator to be determined when used in a single acting cylinder hydraulic circuit and which is described further below in reference to FIG. 11.

In this example, a pilot port 532 is defined in the plug 528 and is configured to couple in flow communication with a pressure compensator (not shown) so that the pressure of the fluid flow; also referred to as load sense pressure, of the hydraulic actuator (not shown) can be sensed as required or desired. The pilot seat 530 is formed within the plug 528 and is axially aligned with the pilot port 532. The pilot seat 530 is shaped and sized to receive a second end 534 of the pilot poppet 526. A pilot channel 536 is formed within the plug 528 and extends between the pilot seat 530 and the inside surface of the plug 528. The pilot channel 536 facilitates fluid flow and pressure distribution during operation of the pilot poppet 526.

The pilot poppet 526 extends along the longitudinal axis 522 and includes an opposite first end 538. The first end 538 of the pilot poppet 526 is attached to the second end 524 of the connecting rod 516 so that as the connecting rod 516 moves toward the inlet configuration and towards the inlet port 506, the pilot poppet 526 disengages from the pilot seat 530 and opens the pilot port 532. In the example, the first end 538 is also biased relative to the second end 524 of the connecting rod 516 with a spring 540. The spring 540 can be a disc spring, Belleville washer, compression spring or the like. The spring 540 is coupled to the connecting rod 516 with a spring ring 542 so that the pilot poppet 526 can move with the connecting rod 516 along the longitudinal axis 522 when the connecting rod 516 is moved towards the inlet configuration. However, when the connecting rod 516 moves toward the tank configuration and towards the tank port 508, the connecting rod 516 can move relative to the pilot poppet 526 while the pilot poppet 526 remains closed to the seat 530 via the spring 540. As such, in the tank configuration, the connecting rod 516 will move against the spring 540 to that the pilot port 532 remains closed. As illustrated in FIG. 10, the pilot poppet 526 is closed relative to the port 532 while the connecting rod 516 is in a closed configuration (e.g., the poppets 512, 514 closing the respective ports 506, 508).

The pilot valve (e.g., the poppet 526 and the seat 530) is disposed proximate the tank port 508 and extends within a tank spring 544. This configuration enables the tank poppet 514 to operate as described above, while also accommodating the pilot poppet 526.

Figure 11:
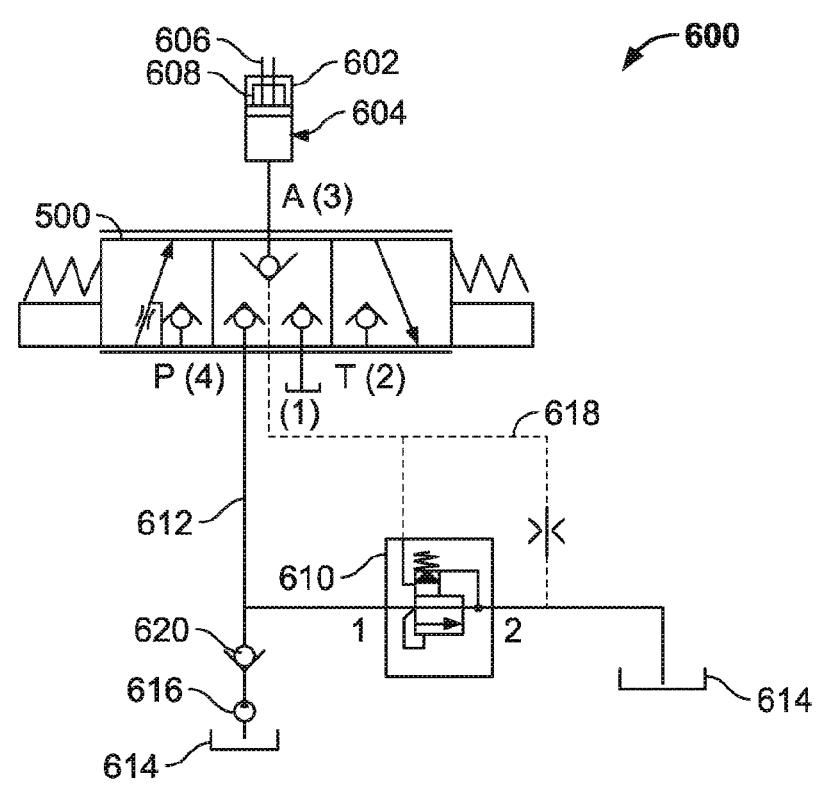
FIG. 11 is a schematic view of another hydraulic circuit.

FIG. 11 is a schematic view of another hydraulic circuit 600. The hydraulic circuit 600 includes a single acting cylinder 602 in which hydraulic fluid is only on one side 604 of the piston 606 and the other side includes a spring 608 that actuates the piston 606 in the opposing direction. In order to accommodate the force of the spring 608, the hydraulic circuit 600 includes a pressure compensator 610 that senses pressure in a pump line 612 from a tank 614 and senses pressure at the hydraulic valve 500 via the pilot valve so as to drive operation of a pump 616 accordingly. The pressure compensator 610 can be coupled in fluid communication to the tank 614 and collect the fluid used for determining pressure at the respective locations on the hydraulic circuit 600. In this example, the pilot port of the valve 500 is coupled in flow communication with the pressure compensator 610 via a pilot line 618. A check valve 620 is also included in the pump line 612.

Figure 12:
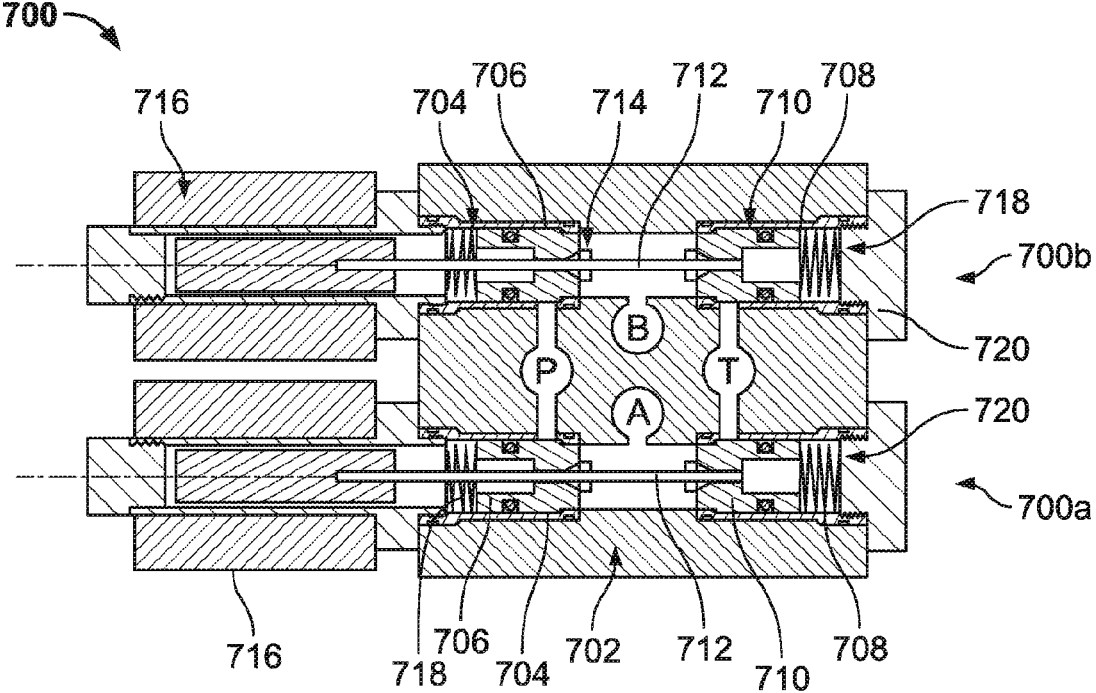
FIG. 12 is a schematic view of another hydraulic valve.

FIG. 12 is a schematic view of another hydraulic valve 700. In this example, a manifold body 702 supports a plurality of valves 700a, 700b which are coupled in fluid communication to a shared pump P and tank T, while each driving separate working ports A, B. Each valve 700 includes an inlet cage 704 housing an inlet poppet 706 and a tank cage 708 housing a tank poppet 710. A connecting rod 712 with collars 714 extends between the poppets 706, 710 and is coupled to an actuator 716 (e.g., a push pull type solenoid with coil). The poppets 706, 710 are each biased by a spring 718 and opposite of the actuator 716 is a plug 720. The valves 700a, 700b operate similarly to the hydraulic valves described above, however, the manifold body 702 can be used in industrial type applications rather than screw-in type cartridge valves as described above.

The hydraulic valves described above have two independent metering poppets that are also connected to an actuator that enable the hydraulic valve to operation like an on-off or a proportional valve as required or desired. Accordingly, the hydraulic valves can be used to simplify control of hydraulic circuits and increase the efficiencies thereof. In the examples described above, the hydraulic valves can be considered a proportional valve, whereby the poppets are configured to be positionable not only in a completely on or off position so as to allow a full flow or no flow, but may also be positionable in one or more intermediate positions so as to allow for an intermediate flow. Examples for proportional valves may include actuating movement via a current on a solenoid so as to be able to obtain the intermediate positions. It should be appreciated, that in the examples described above, the hydraulic valves may alternatively be an on/off valve, whereby the poppets are configured to be positionable only in a completely on or off position so as to only allow a full flow or no flow. In these examples, the poppets may not include notches (e.g., notch 224 shown in FIG. 4) as gradually opening the poppet is no longer need, but poppets may still include the flow channels (e.g., flow channel 240 shown in FIG. 4) so as to equalize pressure on either side of the poppet.

Figure 13:
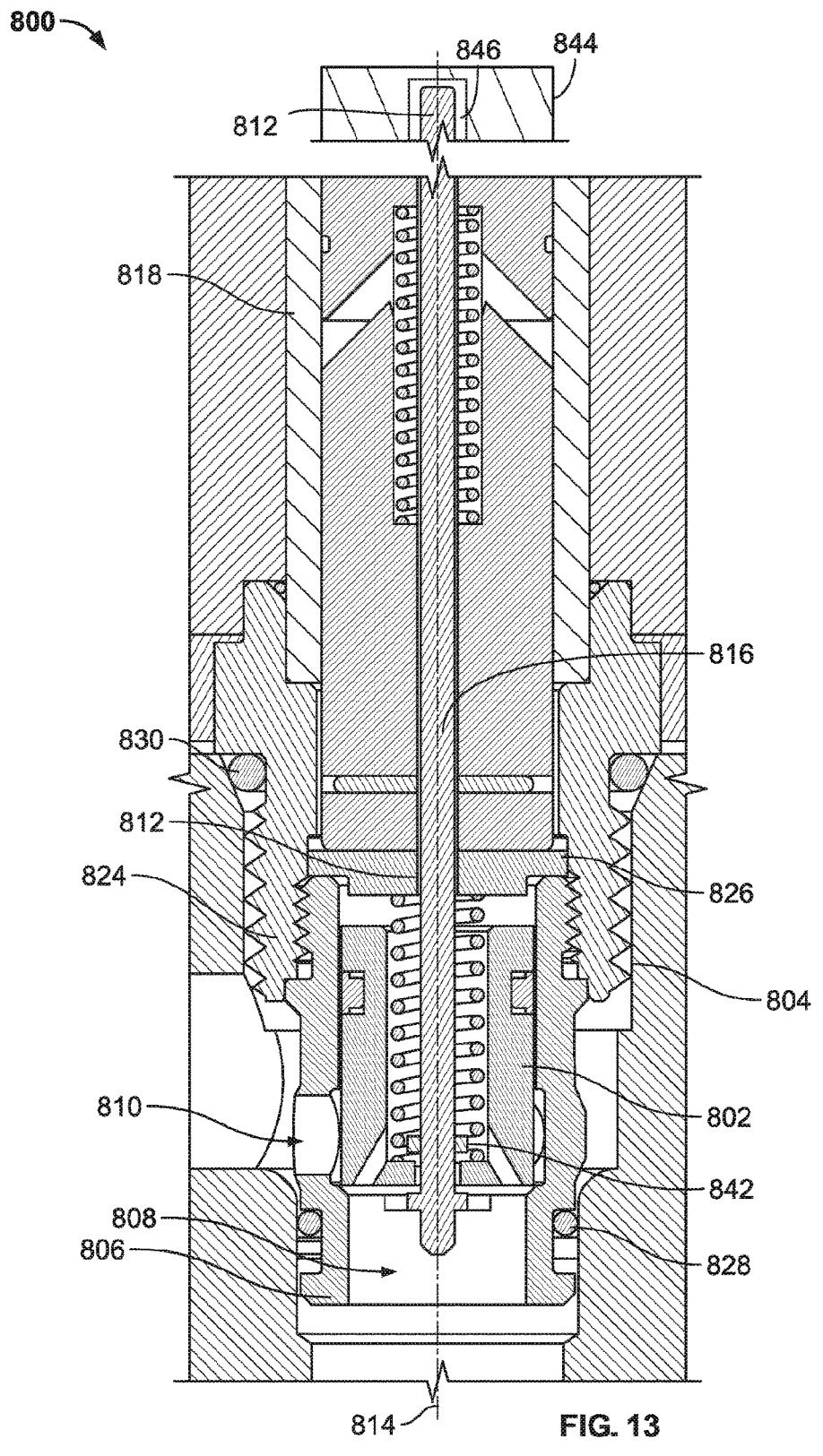
FIG. 13 is a cross-section view of another hydraulic valve.
Figure 14:
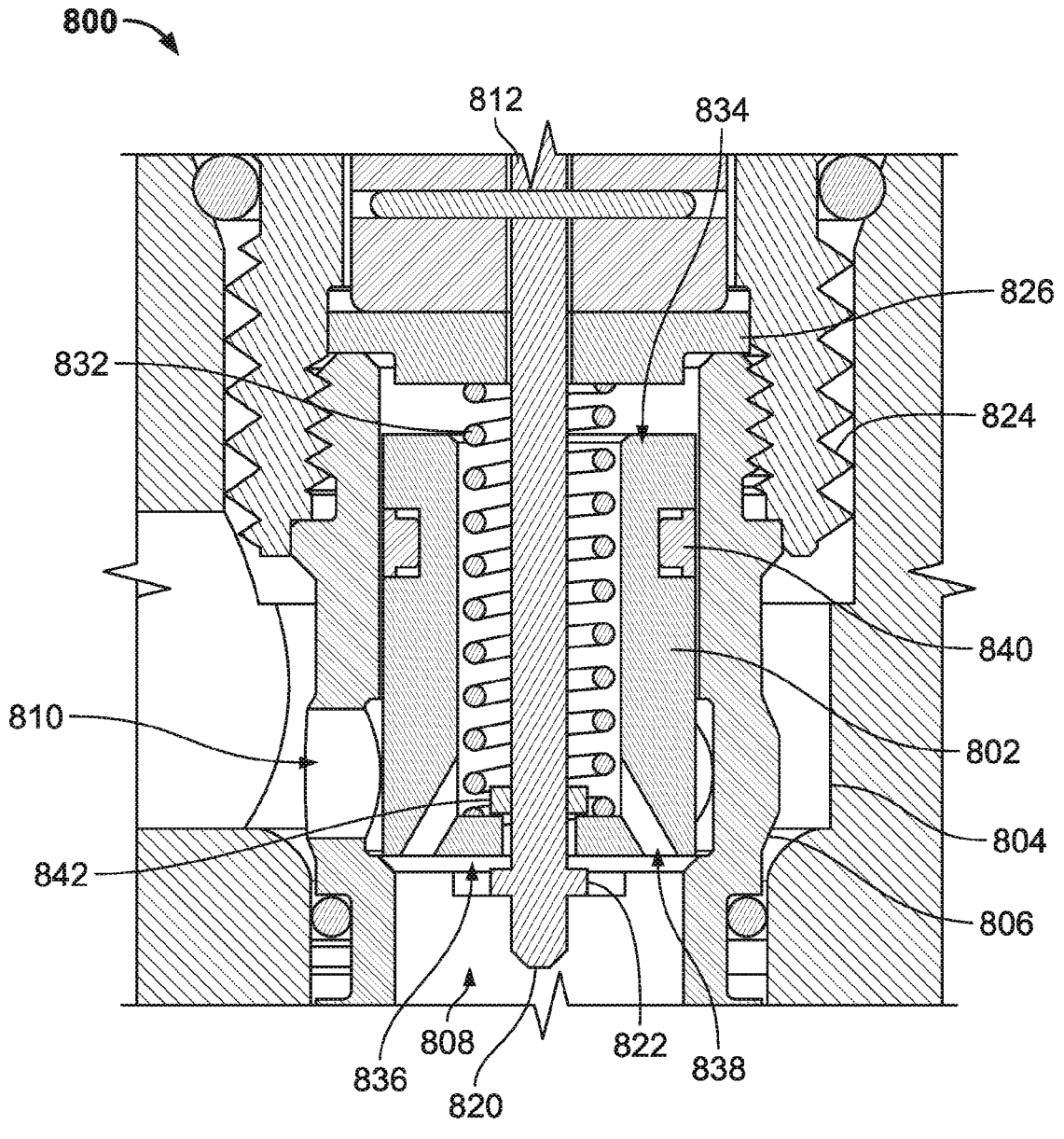
FIG. 14 is an enlarged view of a poppet of the hydraulic valve shown in FIG. 13.

FIG. 13 is a cross-section view of another hydraulic valve 800. FIG. 14 is an enlarged view of a poppet 802 of the hydraulic valve 800 shown in FIG. 13. Referring concurrently to FIGS. 13 and 14, the hydraulic valve 800 is configured to be mounted within a valve manifold 804. The hydraulic valve 800 includes a cage 806 defining a first port 808 and a second port 810 with the poppet 802 therein. The first port 808 is orthogonal relative to the second port 810. In this example, unlike the examples described above, the hydraulic valve 800 is considered a two-way, two-position type valve. A connecting rod 812 couples to the poppet 802 and extends along a longitudinal axis 814. A first end 816 of the connecting rod 812 is coupled to an actuator 818 that drives linear movement of the connecting rod 812 along the longitudinal axis 814. The actuator 818 can be a solenoid, electric motor, manual lever, or any other device that drives linear movement of the connecting rod 812 as described herein. An opposite second end 820 of the connecting rod 812 engages with the poppet 802 via a collar 822. The cage 806 may be coupled to an actuator housing 824 with a washer 826 therebetween. Fluid seals 828, 830 may be disposed between the hydraulic valve 800 and the manifold 804.

The poppet 802 is biased within the cage 806 with a compression spring 832. The poppet 802 includes a first axial face 834 and an opposing second axial face 836. The first axial face 834 engages with the spring 832 and the second axial face 836 engages with the collar 822 of the connecting rod 812. In this example, the second axial face 836 does not have a notch and is substantially square to the sidewall of the poppet 802. The second axial face 836 is substantially orthogonal to the longitudinal axis 814. The poppet 802 includes one or more flow channels 838 that extends between axial faces of the poppet 802 and so as to increase pressure equalization across the poppet 802 and as described above. As such, the poppet 802 is configured for an on/off valve configuration, however, the two-way, two-position valve may alternatively be a proportional valve and have corresponding poppet structure as required or desired. The poppet 802 also includes a sealing member 840.

The second end 820 of the connecting rod 812 also engages with the poppet 802 with a locking ring 842 disposed within the poppet 802. The collar 822 and the locking ring 842 engage the poppet 802 and so that the connecting rod 812 can move the poppet 802 in both directions along the longitudinal axis 814. For example, if the poppet 802 becomes stuck in an open or an at least partially open configuration, the actuator 818 can move the poppet 802 towards a closed configuration. The locking ring 842 may be a circlip or a spring ring in examples. In other examples, the connecting rod 812 can connect to the poppet 802 so that the poppet 802 can move along the longitudinal axis 814 with any other connection type as required or desired. For example, the poppet may thread onto the connecting rod, the poppet may press-fit or snap-fit onto the connecting rod, and the like.

In an aspect, the first end 816 of the connecting rod 812 can be extended through the actuator 818 and received at least partially within a position sensor 844. The position sensor 844 is configured to monitor the position of the connecting rod 812 along the longitudinal axis 814, and thus, monitors a position of the poppet 802 within the hydraulic valve 800. By monitoring the position of the poppet 802, operation of the hydraulic valve 800 is improved. In an example, a pressure tube 846 may be included so that the pressurized fluid around the connecting rod 812 does not affect the position sensor 844.

This disclosure describes some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art. Any number of the features of the different examples described herein may be combined into one single example and alternate examples having fewer than or more than all of the features herein described are possible. It is to be understood that terminology employed herein is used for the purpose of describing particular examples only and is not intended to be limiting. It must be noted that, as used in this specification, the singular forms "a," "an," and "the" include plural referents unless the context clearly dictates otherwise.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A hydraulic valve comprising:

a cage having a first end and an opposite second end defining a longitudinal axis, the cage defining a first port configured to be coupled in fluid communication with a pump, a second port configured to be coupled to a tank, and a third port configured to be coupled to a hydraulic actuator, wherein the third port is disposed between the first port and the second port along the longitudinal axis;

a first poppet biased relative to the first end of the cage, the first poppet movable along the longitudinal axis relative to the first port;

a second poppet biased relative to the second end of the cage, the second poppet movable along the longitudinal axis relative to the second port;

an actuator; and a connecting rod extending along the longitudinal axis, the connecting rod coupled to the actuator and both of the first poppet and the second poppet, wherein the actuator is configured to move the connecting rod along the longitudinal axis such that in a first position, the first poppet at least partially opens the first port so the first port is in fluid communication with the third port, and in a second position, the second poppet at least partially opens the second port so the second port is in fluid communication with the third port, wherein one or more of the first and second poppets include a poppet body having a central opening configured to at least partially receive the connecting rod, the poppet body also having a notch defined in a valve face and coaxially aligned with the central opening, wherein the connecting rod includes a collar configured to engage with the valve face and selectively move the poppet body, the collar aligned along the longitudinal axis with the notch and the central opening, and wherein the collar, the notch, and the central opening are configured to allow fluid flow between fluid volumes defined on either axial side of the poppet body.

2. The hydraulic valve of claim 1, wherein a first valve seat is defined in an inner surface of the cage between the first port and the third port, the first valve seat having a first oblique surface configured to engage with the first poppet, and wherein the first poppet has a first square shoulder configured to engage with the first oblique surface to close the first port, wherein a second valve seat is defined in the inner surface of the cage between the second port and the third port, the second valve seat having a second oblique surface configured to engage with the second poppet, and wherein the second poppet has a second square shoulder configured to engage with the second oblique surface to close the second port.

3. The hydraulic valve of claim 1, wherein one or more of the first and second poppets include a poppet body having an outer surface that faces the cage and an opposite inner surface, the poppet body having one or more flow channels extending between the outer surface and the inner surface, wherein the one or more flow channels at the outer surface are positioned proximate a valve seat of the cage when the poppet body is in a closed configuration.

4. The hydraulic valve of claim 1, wherein the collar is a first collar and the connecting rod includes the first collar configured to engage the first poppet and a second collar configured to engage the second poppet, the first collar and the second collar spaced apart along the longitudinal axis and disposed between the first poppet and the second poppet within the cage.

5. The hydraulic valve of claim 1, wherein the connecting rod has a first end coupled to the actuator and an opposite second end coupled to the second poppet, the hydraulic valve further comprising a pilot poppet attached to the second end of the connecting rod.

6. The hydraulic valve of claim 5, wherein a plug is secured to the second end of the cage, the plug defining a pilot seat.

7. The hydraulic valve of claim 6, wherein the plug defines a fourth port in fluid communication with the pilot seat, wherein when the connecting rod is in the first position, the pilot poppet at least partially opens the fourth port.

8. The hydraulic valve of claim 5, wherein the pilot poppet is biased relative to the connecting rod.

9. The hydraulic valve of claim 1, further comprising an actuator housing including an exterior threaded portion for securing the hydraulic valve within a valve manifold.

10. A hydraulic valve comprising:

a cage extending along a longitudinal axis and defining an inlet port configured to be connected to a pump, a working port configured to be connected to a hydraulic actuator, and a tank port configured to be connected to a tank;

an inlet poppet movable along the longitudinal axis and configured to selectively seal the inlet port;

a tank poppet movable along the longitudinal axis and configured to selectively seal the tank port;

a linear actuator;

a connecting rod coupled to the linear actuator and extending between the inlet poppet and the tank poppet, wherein the linear actuator is configured to drive the connecting rod along the longitudinal axis between at least an inlet configuration whereby the inlet poppet is engaged and a first flow path is defined between the inlet port and the working port, a closed configuration whereby both of the inlet poppet and the tank poppet are disengaged and the inlet port and the tank port are closed, and a tank configuration whereby the tank poppet is engaged and a second flow path is defined between the tank port and the working port;

a pilot valve disposed proximate the tank port, the pilot valve including:

a pilot poppet coupled to the connecting rod, wherein the pilot poppet is biased relative to the connecting rod; and a valve seat formed at a distal end of the cage, wherein when the connecting rod is in the tank configuration, the pilot valve is closed and seated with the valve seat.

11. The hydraulic valve of claim 10, wherein the inlet poppet is biased relative to the cage and the tank poppet is biased relative to the cage, the inlet poppet and the tank poppet biased in opposite directions along the longitudinal axis.

12. The hydraulic valve of claim 10, wherein one or both of the inlet poppet and the tank poppet include a poppet body having a first axial surface area and an opposite second axial surface area, the first axial surface area being equal to the second axial surface area.

13. The hydraulic valve of claim 10, wherein one or both of the inlet poppet and the tank poppet include a poppet body having an outer surface facing the cage and an opposite inner surface, and wherein at least one flow channel is defined within the poppet body and extends between the outer surface and the inner surface.

14. The hydraulic valve of claim 10, wherein one or both of the inlet poppet and the tank poppet include a poppet body having an outer surface facing the cage, and wherein a sealing member is disposed between the outer surface and the cage.

15. A hydraulic valve comprising:

a cage having a first end and an opposite second end defining a longitudinal axis, the cage defining a first port configured to be coupled in fluid communication with a pump, a second port configured to be coupled to a tank, and a third port configured to be coupled to a hydraulic actuator, wherein the third port is disposed between the first port and the second port along the longitudinal axis;

a first poppet biased relative to the first end of the cage, the first poppet movable along the longitudinal axis relative to the first port;

a second poppet biased relative to the second end of the cage, the second poppet movable along the longitudinal axis relative to the second port;

an actuator; and a connecting rod extending along the longitudinal axis, the connecting rod coupled to the actuator and both of the first poppet and the second poppet, wherein the actuator is configured to move the connecting rod along the longitudinal axis such that in a first position, the first poppet at least partially opens the first port so the first port is in fluid communication with the third port, and in a second position, the second poppet at least partially opens the second port so the second port is in fluid communication with the third port, and wherein the connecting rod has a first end coupled to the actuator and an opposite second end coupled to the second poppet, the hydraulic valve further comprising a pilot poppet attached to the second end of the connecting rod.

16. The hydraulic valve of claim 15, wherein a plug is secured to the second end of the cage, the plug defining a pilot seat.

17. The hydraulic valve of claim 16, wherein the plug defines a fourth port in fluid communication with the pilot seat, wherein when the connecting rod is in the first position, the pilot poppet at least partially opens the fourth port.

18. The hydraulic valve of claim 15, wherein the pilot poppet is biased relative to the connecting rod.

* * * * *